United States Patent
Bächle et al.

(10) Patent No.: US 8,228,146 B2
(45) Date of Patent: Jul. 24, 2012

(54) APPARATUS FOR MONITORING THE STATE OF A PROTECTIVE DEVICE OF A MACHINE

(75) Inventors: Erik Bächle, Filderstadt (DE); Walter Link, Rutesheim (DE)

(73) Assignee: Euchner GmbH & Co. KG, Leinfelden-Echterdingen (DE)

( * ) Notice: Subject to any disclaimer, the term of this patent is extended or adjusted under 35 U.S.C. 154(b) by 285 days.

(21) Appl. No.: 12/226,541

(22) PCT Filed: Apr. 24, 2007

(86) PCT No.: PCT/EP2007/003580
§ 371 (c)(1),
(2), (4) Date: Oct. 21, 2008

(87) PCT Pub. No.: WO2008/009319
PCT Pub. Date: Jan. 24, 2008

(65) Prior Publication Data
US 2009/0134961 A1    May 28, 2009

(30) Foreign Application Priority Data
Jul. 19, 2006   (DE) .................. 10 2006 033 355

(51) Int. Cl.
*H01H 9/00*    (2006.01)
*H01H 27/00*   (2006.01)
(52) U.S. Cl. ........ 335/179; 335/177; 335/189; 335/190; 335/192; 335/194; 335/229; 200/43.04; 200/43.11; 200/334

(58) Field of Classification Search ................. 335/6, 26, 335/27, 68, 73, 75, 77, 78, 132, 138, 172, 335/174, 177, 179, 184, 189, 190–192, 194–195, 335/205, 220, 219, 229; 200/17 R, 5 R, 5 A, 200/43.01, 43.04–43.09, 61.62–61.68, 334
See application file for complete search history.

(56) References Cited

U.S. PATENT DOCUMENTS
2,105,723 A * 1/1938 Dyer et al. .................. 290/36 R
(Continued)

FOREIGN PATENT DOCUMENTS
DE          195 25 083 A1    1/1996
(Continued)

*Primary Examiner* — Mohamad Musleh
(74) *Attorney, Agent, or Firm* — Roylance, Abrams, Berdo & Goodman L.L.P.

(57) ABSTRACT

An apparatus (1) for monitoring the state of a protective device (2) of a machine (4) in particular is a safety switch for monitoring the closed state of a protective door or the like. The apparatus (1) has a switch housing (22) with a switch head (24) and an actuator (8). In the closed state of the protective device (2), the actuator interacts with the switch head (24) and, as a result, the closed state of the protective device (2) can be signaled. The apparatus (1) has a tumbler device (20) with a tumbler element (30) mounted movably in the apparatus (1) and by which the closed state of the protective device (2) can be locked releasably. The tumbler device (20) has at least one permanent magnet (34). By the magnetic force, the tumbler element (30) can be fixed in a first position when the power supply to the apparatus (1) is switched off, in which first position the tumbler device (20) locks the closed state of the protective device (2), and/or can be fixed in a second position, in which the tumbler device (20) does not lock the closed state of the protective device (2).

8 Claims, 5 Drawing Sheets

U.S. PATENT DOCUMENTS

| | | | | |
|---|---|---|---|---|
| 5,365,210 | A | * | 11/1994 | Hines .............................. 335/238 |
| 5,488,207 | A | * | 1/1996 | Niwa et al. .................. 200/43.04 |
| 5,868,243 | A | * | 2/1999 | Bachle .......................... 200/334 |
| 6,870,451 | B1 | * | 3/2005 | Inoue ............................. 335/172 |
| 6,982,391 | B2 | * | 1/2006 | Da Dalt ..................... 200/43.04 |
| 7,271,355 | B2 | * | 9/2007 | Yu .............................. 200/174 R |
| 7,605,335 | B2 | * | 10/2009 | Hiltl et al. .................. 200/43.04 |
| 2002/0057153 | A1 | * | 5/2002 | Matsusaka et al. ........... 335/220 |
| 2004/0217834 | A1 | * | 11/2004 | Morita et al. ................. 335/220 |
| 2005/0199478 | A1 | * | 9/2005 | Jones ......................... 200/43.04 |
| 2007/0200653 | A1 | * | 8/2007 | Matsumoto et al. .......... 335/179 |
| 2008/0264766 | A1 | * | 10/2008 | Hermann et al. .......... 200/43.11 |

FOREIGN PATENT DOCUMENTS

| | | |
|---|---|---|
| DE | 10 2004 038 488 A1 | 2/2006 |
| DE | 10 2004 047 574 A1 | 4/2006 |
| DE | 10 2005 032 172 A1 | 1/2007 |
| EP | 0 871 189 A1 | 10/1998 |
| EP | 1 741 855 A2 | 1/2007 |

* cited by examiner

APPARATUS FOR MONITORING THE STATE OF A PROTECTIVE DEVICE OF A MACHINE

FIELD OF THE INVENTION

The invention relates to an apparatus for monitoring the state of a protective device of a machine. In particular, a safety switch monitors the closed state of a protective door or the like, having a tumbler function for the protective device.

BACKGROUND OF THE INVENTION

DE 43 28 297 C1 discloses a safety switch having a switch head receiving an actuator fixed, for example, on the protective door of a protective device to turn a ratchet wheel. Within the switch housing, a contact plunger is held in contact with the peripheral surface of the ratchet wheel. At an angle of rotation corresponding to the closed position of the protective door, the contact plunger engages a catch depression provided for this purpose on the peripheral surface of the ratchet wheel, and thus, closes a contact pair. In this way, the inserted state of the actuator and, accordingly, the closed position of the protective door can be electrically signaled.

For many applications, for example, for protective hoods on machine tools or the like, in addition it is necessary for the safety switch to make available a tumbler function, i.e., for the actuator to be lockable in the switch head, in particular to be lockable with respect to being routed out of the switch head, and thus for the protective device to be lockable in the closed state. In the prior art safety switch, the contact plunger is held in the catch depression, loaded by spring force or magnetic force, and thus blocks rotary motion of the cam disk.

For some applications, it is necessary, for example, for reasons of fire protection, for instance, when the electrical voltage supply of the machine is turned off in case of a fault, for the protective device to be locked in the closed state, for example, in the closed position of the protective door. This need engenders the problem that in the otherwise de-energized state of the apparatus, for example, on the occasion of cleaning activities on the weekend, in an unintentional or inadvertent closing of the protective device the tumbler device is activated. The protective device is then locked or held then in the undesirable closed state. The requirement for "tumbler in the de-energized state" and simultaneous "prevention of activation of tumbler in the de-energized state" therefore constitutes an apparently insurmountable contradiction for generic apparatus.

DE 10 2004 047 574 A1 discloses a solution to this problem in which a blocking element is mounted to be transversely movable to the tumbler element and in a position fixing the tumbler element positively to engage a recess in the tumbler element. This known solution dictates a larger-scale design of the apparatus.

SUMMARY OF THE INVENTION

An object of the invention is to provide an apparatus for monitoring the state of a protective device of a machine overcoming the disadvantages of the prior art. In particular, the object of the invention is to provide an apparatus with a tumbler device made to implement both the function "tumbler in the de-energized state" and the function "prevention of activation of tumbler in the de-energized state" with a reduced design size. In one embodiment, an exact tumbler is to be permanently and reliably ensured, and thereby, large tumbler forces are to be made available economically and durably with structurally simple means. Production, installation and maintenance of the apparatus are to be simplified to save time and money.

This object is basically achieved by an apparatus having at least one permanent magnet whose magnetic force is sufficient to fix the tumbler element optionally against the action of another applied force, for example, by a spring element to the tumbler element. In one embodiment the permanent magnet fixes the tumbler element in a first position in which the tumbler device locks the closed state of the protective device, for example, by the actuator being locked in the switch head and the actuator cannot be guided out of the switch head, if the tumbler element is in or near this first position when the power supply of the apparatus is turned off.

In one embodiment, the permanent magnet fixes the tumbler element in a second position in which the tumbler device does not lock the closed state of the protective device if the tumbler element is in or near this second position at the instant the power supply of the apparatus is turned off.

In another embodiment, the permanent magnet can fix the tumbler element both in the first position and in the second position, depending on in which position the tumbler element is located at the instant the power supply of the apparatus is turned off.

There can also be two or more permanent magnets, in which the tumbler element can be fixed in the first position by a first permanent magnet, and the tumbler element can be fixed in the second position by a second permanent magnet.

For the interaction of the tumbler element with the permanent magnet, the tumbler element is made to be magnetizable at least in sections and has, for example, a first, preferably cylindrical, section of a magnetizable material. The tumbler element can be dynamically connected to the plunger at the same time for actuating an electrical switching element of the apparatus. In particular, it can be part of the plunger or can form a section of the plunger, or the plunger and the tumbler element are made in one piece.

In one embodiment, the tumbler element is mounted to be linearly movable in the apparatus and in particular in the tumbler device.

For example, the tumbler element can have the form of an elongated cylinder and can be mounted to be movable along its longitudinal axis. In one embodiment, the tumbler element has sections with differing radial extensions.

In one embodiment, the permanent magnet extends around the tumbler element and is preferably made ring-shaped. The permanent magnet can be magnetized axially or radially relative to the direction of motion of the tumbler element. The magnetic flux caused by the permanent magnet at least partially flows and at least in the first or second fixed position through the tumbler element, and thus, exerts the force fixing the tumbler element.

In one embodiment, the permanent magnet has a capture region. As soon as the tumbler element is moved into the capture region, the permanent magnet applies a force to the tumbler element by which the tumbler element is transferred into the first or second position and is fixed therein. The geometrical arrangement of the permanent magnet relative to the tumbler element is preferably chosen such that due to the tumbler element's entering the capture region of the permanent magnet, the force transferring the tumbler element into the fixing position becomes greater over the course of the transfer motion.

In one embodiment, the tumbler element has at least one electromagnet, by whose energizing the fixing of the tumbler element can be cancelled. For this purpose, the electromagnet can be energized, in particular can be energized with a direct current in a suitable current direction, such that the magnetic flux caused by the electromagnet reduces the magnetic flux caused by the permanent magnet or even more or less completely compensates for it. In this way the force applied by the permanent magnet to the tumbler element is no longer sufficient to fix the tumbler element in position. The tumbler element can then be moved out of the fixed position, for example, as a result of the force applied by an energy storage mechanism.

In one embodiment, the magnetic force applied to the tumbler element can be increased by energizing the electromagnet. In this way, for example, the tumbler element as a result of the magnetic force of the electromagnet can be moved into the capture region of the permanent magnet, if necessary even against the action of the energy storage mechanism. The energy storage mechanism is made, for example, as a compression spring and applies a force to the tumbler element against the magnetic force of the permanent magnet.

In one embodiment, amplification or attenuation of the magnetic force applied by the permanent magnet to the tumbler element is caused by switching the direction of current flow through the electromagnet. Energizing can take place with a continuous current. The current value can be adjustable and controllable, for example, to be able to vary the magnetic force applied by the electromagnet to the tumbler element. For example, the electromagnet can be briefly supplied with an overcurrent to guide the tumbler element into the capture region of the permanent magnet and/or to route the tumbler element out of the capture region. Energizing can also take place pulsed, in which the amplitude of the current pulses and/or the duration of the current pulses can be controllable to be able to vary the magnetic force applied by the electromagnet to the tumbler element.

In one embodiment, by energizing the electromagnet, the tumbler element can be transferred from the first position into the second position and/or can be transferred from the second position into the first position. To do this, in the simplest case a single electromagnet can be used and energizable in one current direction or the other. In one embodiment the apparatus has two or more electromagnets. By energizing a first electromagnet the tumbler element can be transferred from the first position into the second position, and by energizing the second electromagnet the tumbler element can be transferred from the second position into the first position. At the same time, the magnetic force applied by the permanent magnet to the tumbler element can be varied, in particular, reduced, by one of the electromagnets.

In one embodiment the electromagnet can be made as a coil in whose interior the tumbler element is mounted to be longitudinally movable. The permanent magnet is located bordering the electromagnet, in particular in the core of the electromagnet which routes the magnetic flux. In one embodiment the permanent magnet is located in the yoke of the electromagnet.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
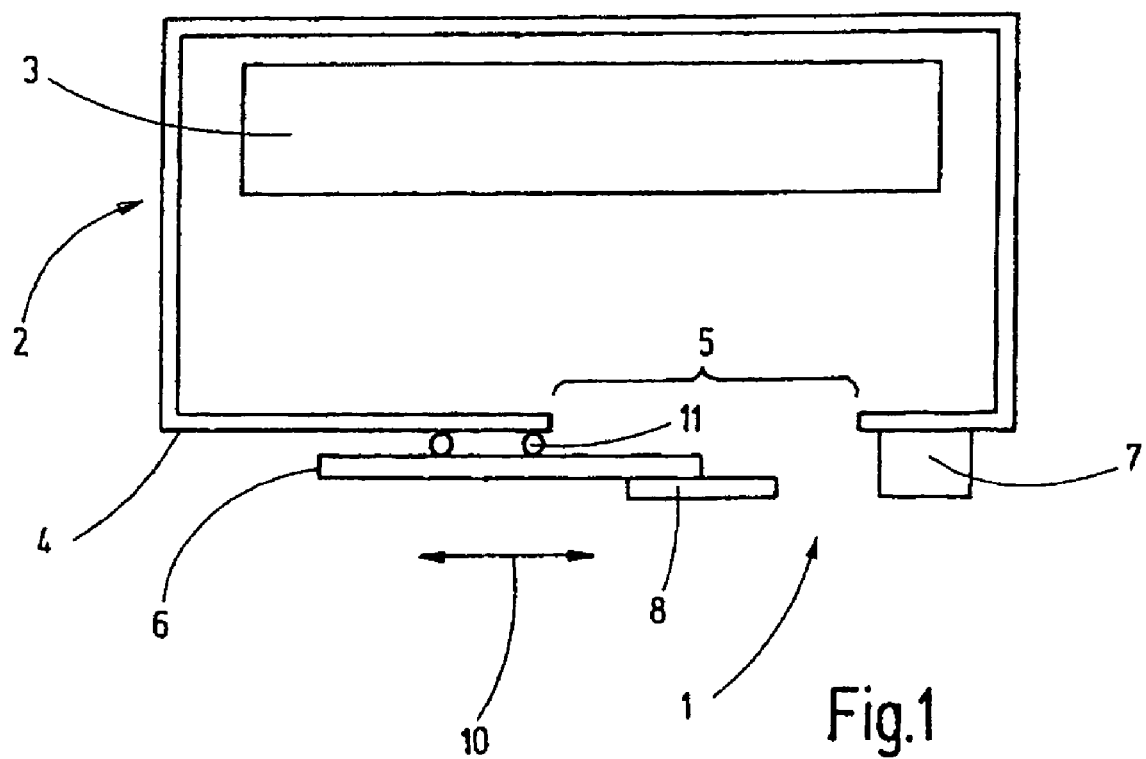
FIG. 1 is a schematic plan view of the overall arrangement with an apparatus according to the invention.

FIG. 1 is a schematic plan view of the overall arrangement of an apparatus 1 according to the invention for monitoring the state of a protective device 2 of a machine 3, in particular of the closed state of a protective door. A space separation device can be locked in order, for example, to protect operators against hazards posed by the machine 3 in operation. The device 2 has a first part 4, for example, a frame for the protective device 2. The first part 4 has an opening 5 which can be closed by a movable second part 6, for example, a protective door, according to the double arrow 10, relative to the first part 4. Second part 6 is mounted to be movable by bearing elements 11. The apparatus 1 has a safety switch comprising a switch element 7 located preferably on the stationary first part 4 of the protective device 2 and comprises an actuator 8 located on the movable second part 6.

Figure 2:
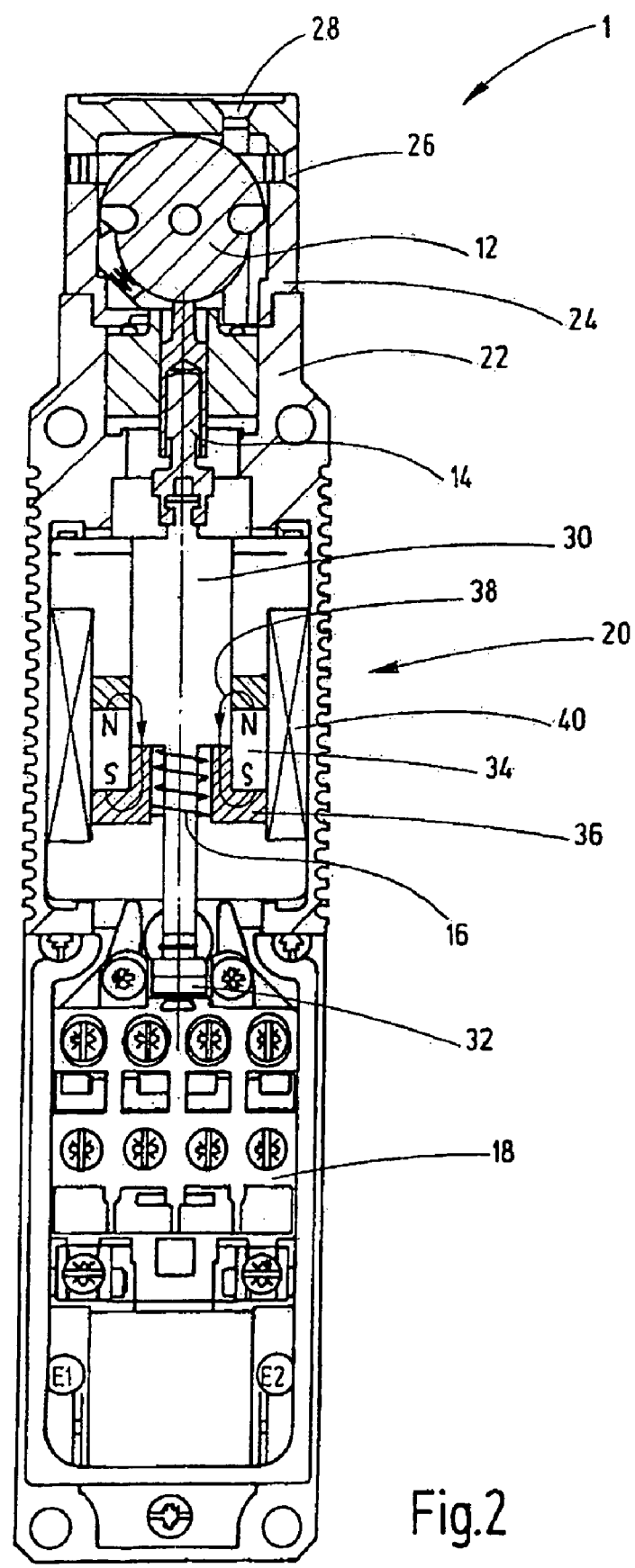
FIG. 2 is a detailed plan view in section of an apparatus according to a first embodiment of the invention.

FIG. 2 is a detailed plan view of a first embodiment of the apparatus 1 with a switch housing 22 and a switch head 24 attached to housing 22. For inserting the actuator 8 (FIG. 1), switch head 24 has two insertion channels 26, 28 located essentially equidistantly from one edge of the essentially cubic switch head 24 and aligned at a right angle to one another. In the switch head 24, a ratchet wheel 12 is mounted to rotate around an axis aligned perpendicular to the plane of the drawing. The wheel projects into the two insertion channels 26, 28 and can be rotated by inserting the actuator 8 into one of the insertion channels 26, 28. On the ratchet wheel 12, a plunger 14 is held in contact by an energy storage mechanism 16 mounted in the switch housing 22. The contact plunger 14 actuates an electrical switching element 18 located in the section of the switch housing 22 opposite the switch head 24.

Between the switch head 24 and the switching element 18, a tumbler device 20 is located in the switch housing 22 and has a tumbler element 30 mounted to be movable along its longitudinal axis. The tumbler element is cylindrical in sections and formed, in particular, in a thickened section at least partially from a magnetizable material. On its end facing the switch head 24, the plunger element 30 is positively connected to the first section of the plunger 14 which is in contact with the ratchet wheel 12 in its further extension. On the end facing the switching element 18, the tumbler element 30 has a tapered or reduced diameter cylindrical section in contact with the actuating plunger 32 of the switching element 18.

Energy storage mechanism 16 is supported on one shoulder of the tumbler element 30 formed by the transition from the tapered cylindrical section to the thickened section of the tumbler element 30 having the magnetizable material. Proceeding from the tapered section, the transition initially is right-angled to then undergo transition into a conical section which on its widened end undergoes transition into the subsequent thickened section of the tumbler element 30.

The tumbler device 20 has a permanent magnet 34 magnetized in the axial direction relative to the direction of motion of the tumbler element 30 and inserted into a pole core 36 which conducts the magnetic flux. The permanent magnet 34 and the pole core 36 are connected to one another and are separated only by a small air gap from the tumbler element 30, in particular from the thickened section of the tumbler element 30. This structure results in a magnetic flux indicated by the field line 38 and entering the tumbler element 30 from the permanent magnet 34 directly or, by way of the pole core 36. In sections it penetrates the tumbler element 30 and then again enters the pole core 36 or the permanent magnet 34 directly. In this way, the permanent magnet 34 applies a magnetic force to close the air gap to the tumbler element 30 and thus to counteract the force applied by the energy storage mechanism 16 and fixes the tumbler element 30 in the illustrated position in which the tumbler device 20 does not lock the ratchet wheel 12, so that an actuator 8 could be inserted into the switch head 24 without the tumbler being activated.

Radially relative to the direction of motion of the tumbler element 30 outside the permanent magnet 34, an electromagnet 40 is located and can be energized in a controllable manner, the direction of current flow being reversible. In particular, the direction of current flow can be chosen by the electromagnet 40 either such that the resulting magnetic flux counteracts the magnetic flux caused by the permanent magnet 34, or can be selected such that the magnetic flux of the electromagnet 40 amplifies the magnetic flux of the permanent magnet 34.

FIGS. 3 to 8 show different states of the embodiment of FIG. 2. Of the apparatus 1, in FIGS. 3 to 8 only the upper part of the switch housing 22 is shown enlarged each time; the lower part of the switch housing 22 is made as is shown in FIG. 2.

Figure 3:
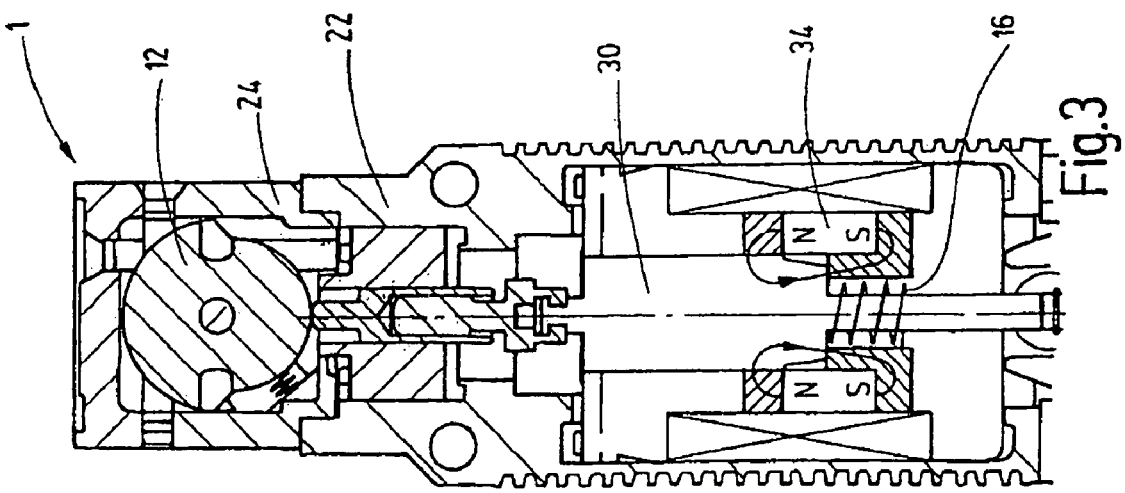

FIG. 3 shows the initial state, illustrated in FIG. 2, in which the actuator 8 is not inserted into the switch head 24 and the tumbler element 30 is fixed by the magnetic force of the permanent magnet 34 in the position in which the tumbler element 30 does not lock the ratchet wheel 12. This state is also maintained when the power supply of the apparatus 1 is turned off. It is a stable state since the magnetic force applied by the permanent magnet 34 is greater than the force of the energy storage mechanism 16 acting in the opposite direction on the tumbler element 30.

Figure 4:
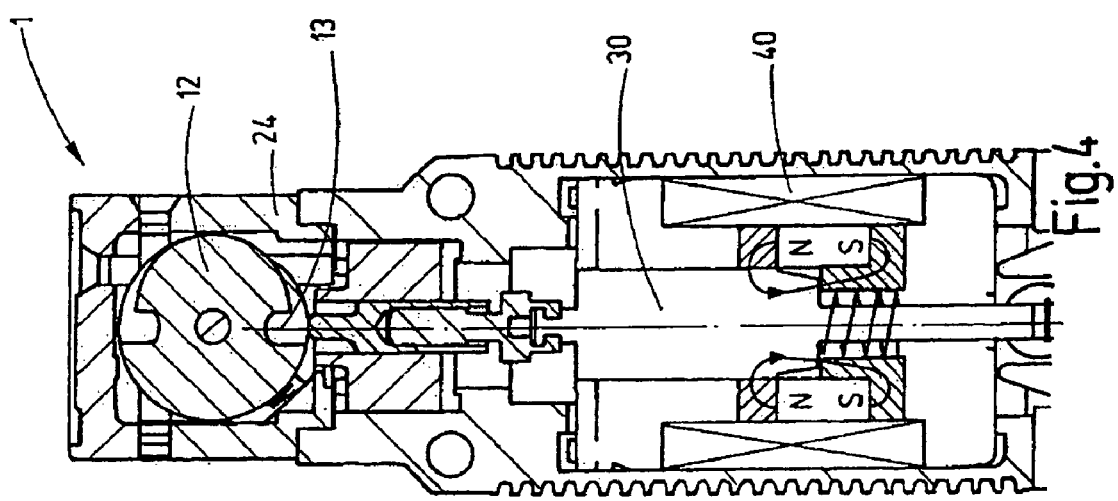

If, proceeding from the position shown in FIG. 3, the actuator 8 is inserted into the switch head 24, the ratchet wheel 12 consequently is turned approximately 90° counterclockwise from FIG. 3 so that for the ratchet wheel 12 the position shown in FIG. 4 results. The electromagnet 40 is not energized so that the tumbler element 30 remains in its fixed position and the ratchet wheel 12 is not blocked. Accordingly, the tumbler device does not lock the closed position of the protective device 2. Rather the protective door could be opened again and the actuator 8 could be guided out of the switch head 24.

Figure 5:
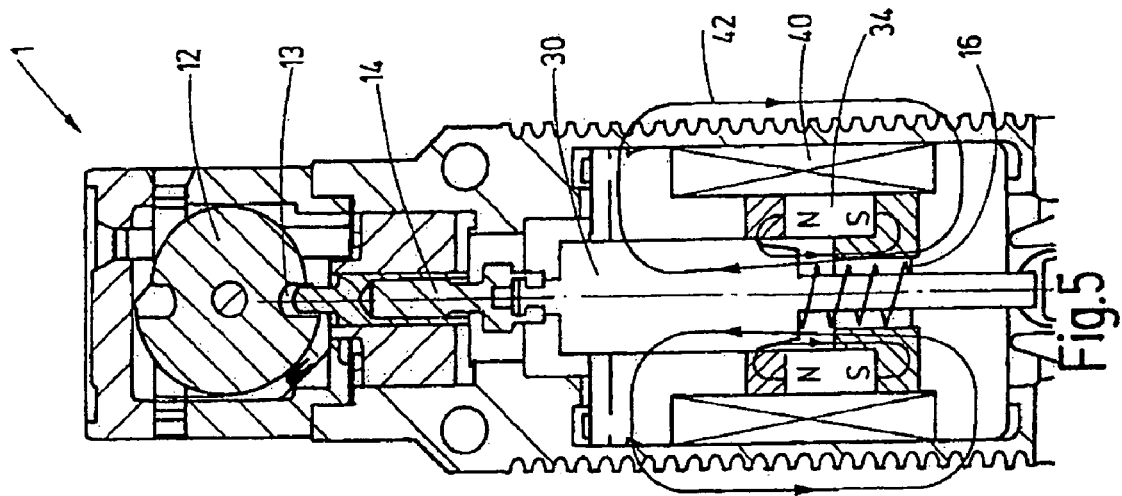
FIGS. 3 to 8 are partial, detailed plan views of different states of the apparatus of the embodiment of FIG. 2.

If the electromagnet 40 is energized in a suitable current direction, the magnetic flux shown by the field line 42 in FIG. 5 weakens the fixing action of the permanent magnet 34 on the tumbler element 30 because the magnetic flux caused by the electromagnet 40 in the region of the tumbler element 30 is directed opposite the magnetic flux caused by the permanent magnet 34. In this way the magnetic action of the permanent magnet 34 on the tumbler element 30 is cancelled or in any case reduced so dramatically that at this point the force applied by the energy storage mechanism 16 prevails and the tumbler element 30 is moved into the position shown in FIG. 5 in which the tumbler element 30 or its axial extension engages a recess 13 in the ratchet wheel 12 by the plunger 14 and blocks said ratchet wheel against further rotary motion.

In this state the tumbler element 30 is fixed in the position in which the tumbler device 20 locks the closed state of the protective device 2. This state is also maintained when the energizing of the electromagnet 30 is turned off, as follows from FIG. 6. In this case the permanent magnet 34 is still acting, and a magnetic flux through the tumbler element 30 may also occur, but it is too small to cause the tumbler element 30 to move against the action of the energy storage mechanism 34 due to the fact that the thickened section of the tumbler element 30 is located outside the capture region of the permanent magnet 34.

Figure 8:
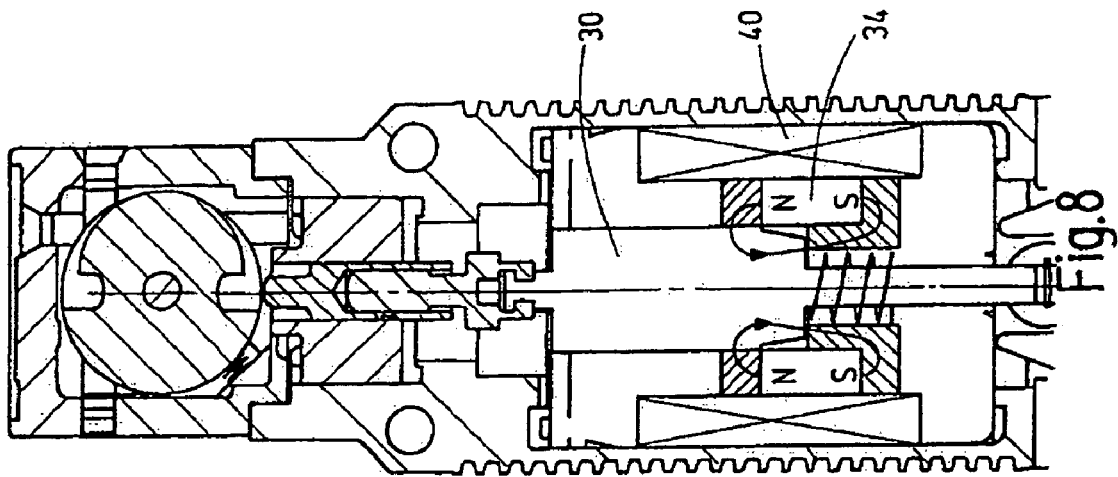
Figure 7:
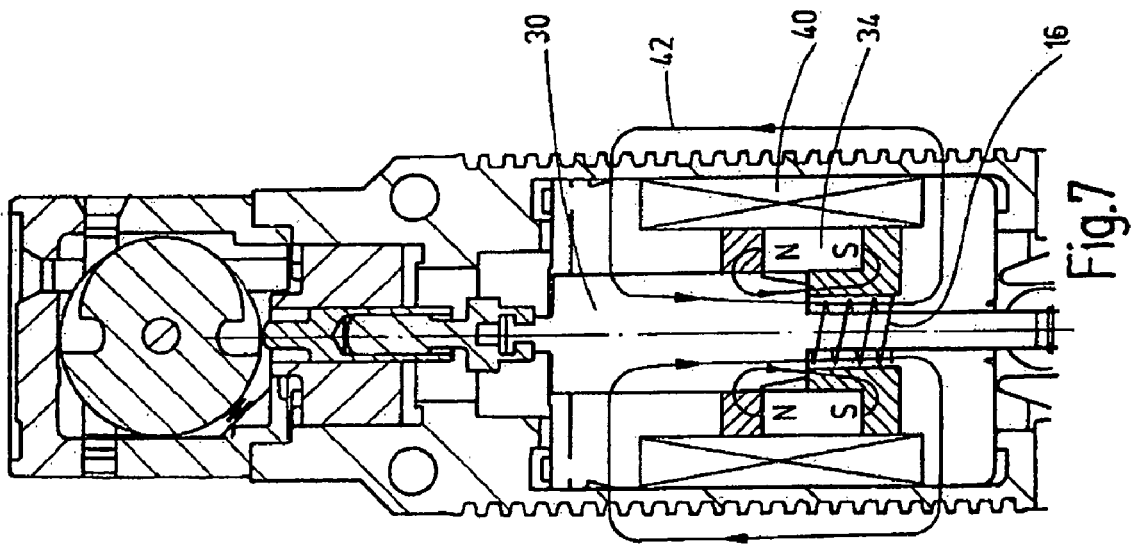
Figure 6:
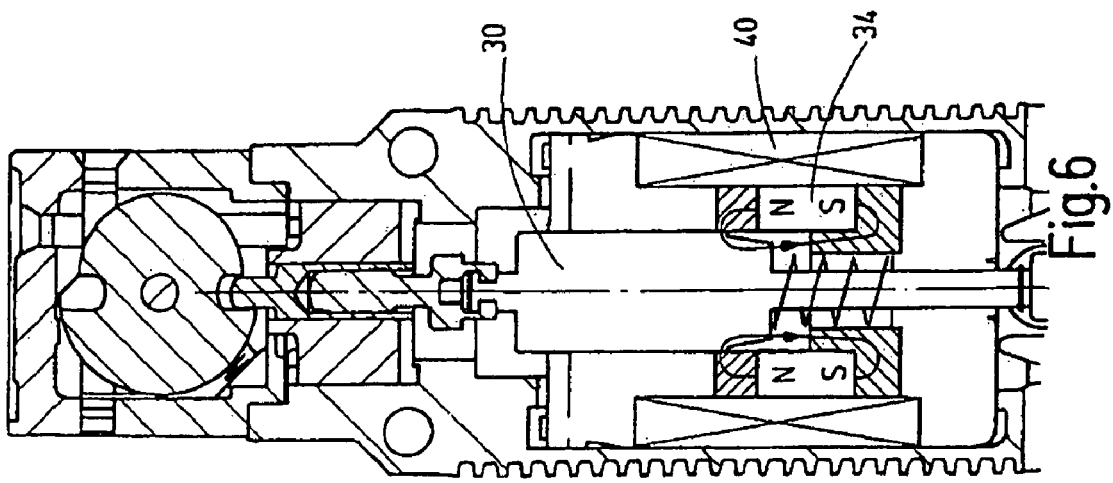

Only by energizing the electromagnet 40 in a suitable direction as is shown by the field line 42 in FIG. 7 can a magnetic force which is greater than the force of the energy storage mechanism 16 be applied to the tumbler element 30. The tumbler element 30 is then moved in the direction of the permanent magnet 34, in particular, into the capture region of the permanent magnet 34 in which the force applied by the permanent magnet 34 to the tumbler element 30 is sufficient to transfer it into the position shown in FIG. 7 and fix it there, even when the energizing of the electromagnet 40 is turned off, as is shown in FIG. 8. In this state the actuator 8 can be routed out of the switch head 24 so that in turn the initial state shown in FIG. 3 results.

Figure 9:
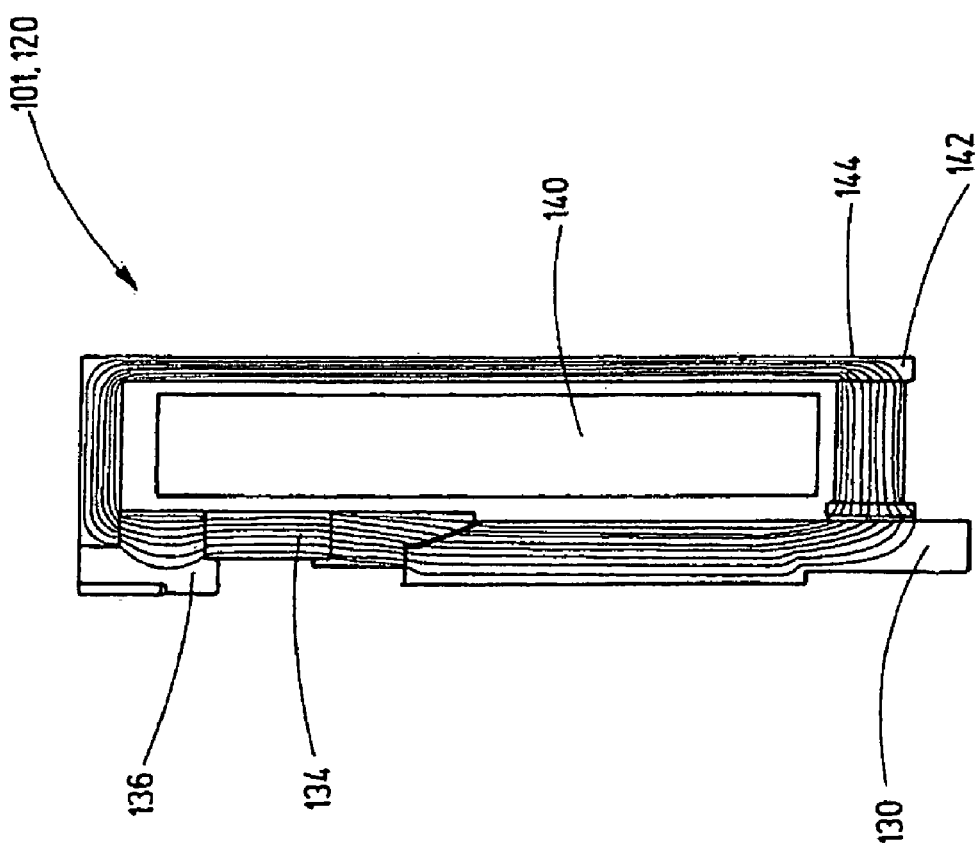
FIG. 9 is an enlarged, partial plan view of an apparatus according to a second embodiment of the invention.

FIG. 9 shows an enlarged extract of a second embodiment of the apparatus 101 and, in particular, of the tumbler device 120 in the region of the electromagnet 140. The winding of the electromagnet 140 is surrounded by a magnetic core 144 which conducts the magnetic flux well, and in which the magnetic flux is guided, as shown by the field lines 142. On one side facing the tumbler element 130, on the electromagnet 140 there is a permanent magnet 134 polarized relative to the direction of motion of the tumbler element 130 in the axial direction and, accordingly, the magnetic flux also flows through it. The permanent magnet 134 is embedded on its two axial end sides in the pole core 136 which is part of the magnetic core 144.

Figure 10:
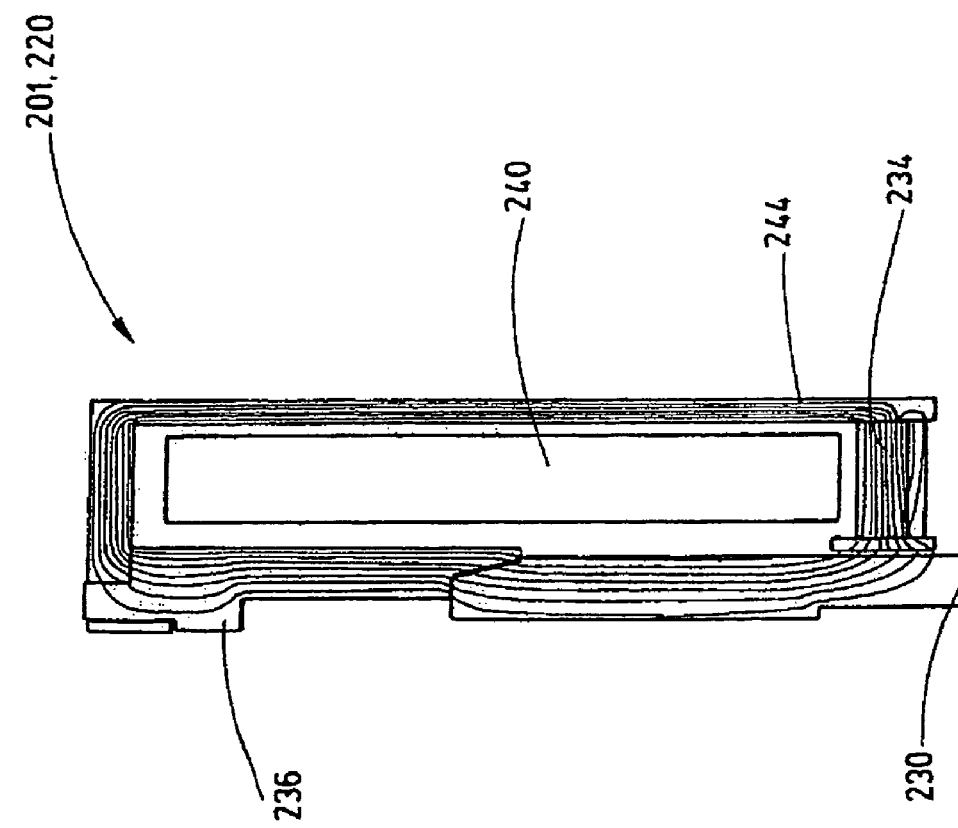
FIG. 10 is an enlarged, partial plan view of an apparatus according to a third embodiment of the present invention.

FIG. 10 shows an enlarged extract through a third embodiment of the apparatus 201 and, in particular, of the tumbler device 220 in the region of the electromagnet 240. The permanent magnet 234 is located on one side which adjoins the side of the permanent magnet 240 facing the tumbler element 230. The permanent magnet 234 is radially magnetized relative to the direction of motion of the tumbler element 230. The pole core 236 forms a part or section of the core 244 which conducts the magnetic flux. The permanent magnet 234 is in turn located in the magnetic yoke of the electromagnet.

What is claimed is:

1. A safety switch for monitoring a state of a protection device, comprising:
    a switch housing with a switch head;
    an actuator interacting with said switch head in a closed state of the protective device to signal the closed state of the protective device; and
    a tumbler device with a tumbler element axially movably mounted in said switch housing and releasably locking said actuator with said switch head in the closed state of the protective device, said tumbler device having at least one permanent magnet generating a magnet force retaining said tumbler element in at least one of a first position in which said tumbler device locks the closed state of the protective device and a second position in which said tumbler device unlocks the closed state of the protective device when a power supply to the safety switch is turned off, said tumbler device having at least one electromagnet generating a magnetic force when energized to transfer said tumbler element between said first and second positions, said permanent magnet being located in an axial direction within axial extents of said tumbler element and said electromagnet such that said permanent magnet, said tumbler element and said electromagnet overlap in a radial direction, magnetic flux of said electromagnet weakening the magnetic force of said permanent magnet on said tumbler element by said magnetic flux of said electromagnet being opposite magnetic flux of said permanent magnet to allow said tumbler element to move to the other of the first and second positions.

2. A safety switch according to claim 1 wherein said permanent magnet is ring shaped and extends about said tumbler element.

3. A safety switch according to claim 1 wherein
a spring biases said tumbler element and applies a biasing force toward one of said first and second positions; and
said permanent magnet counteracts said biasing force.

4. A safety switch according to claim 1 wherein
said permanent magnet has a capture region and retains said tumbler element by said magnet force thereof into one of said first and second positions as soon as said tumbler element enters said capture region.

5. A safety switch according to claim 1 wherein said electromagnet generates the magnetic force thereof in a pulsed manner.

6. A safety switch according to claim 1 wherein
said electromagnet has a yoke causing the magnet flux thereof; and
said permanent magnet is located in said yoke.

7. A safety switch according to claim 1 wherein
said permanent magnet retains said tumbler device in said second position against a biasing force of a spring toward said first position in a capture region of said permanent magnet.

8. A safety switch according to claim 7 wherein
said electromagnet generating the magnetic force thereof when energized that cancels said magnetic force of said permanent magnet on said tumbler element.

* * * * *